3,635,939
MONOAZO DYES CONTAINING PHTHALIMIDES

Johannes Dehnert, Ludwigshafen, Walter Grosch, Mannheim, and Gerhard Gnad, Ludwigshafen, Germany, assignors to Badische Anilin- & Soda-Fabrik Aktiengesellschaft, Ludwigshafen (Rhine), Germany
No Drawing. Continuation-in-part of application Ser. No. 703,273, Feb. 6, 1968. This application May 27, 1970, Ser. No. 41,083
Claims priority, application Germany, Feb. 14, 1967, P 16 44 056.5
Int. Cl. C09b 29/30
U.S. Cl. 260—152                    2 Claims

ABSTRACT OF THE DISCLOSURE

Dyes containing sulfonic acid groups derived from 3-aminophthalimides, or 4-aminophthalimides, and 2-amino-8-hydroxynaphthalene-6-sulfonic acid, which are especially suitable for dyeing polyamides.

---

This is a continuation-in-part of application Ser. No. 703,273, now abandoned.

This invention relates to new monoazo dyes containing sulfonic acid groups and having the Formula I:

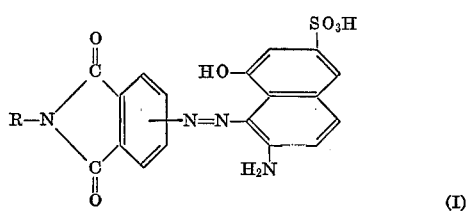

where R denotes a phenyl, methylphenyl, ethylphenyl, butylphenyl, dimethylphenyl, methoxyphenyl, chlorophenyl or naphthyl radical.

The new dyes are obtained by coupling a diazo compound of an amine having the Formula II:

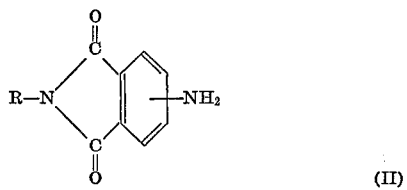

where R has the above meaning with 2-amino-8-hydroxynaphthalene-6-sulfonic acid in an acid medium.

The diazo components having the Formula II are the 3-aminophthalimide or 4-aminophthalimide, where the hydrogen atom at the imide nitrogen is replaced by R.

The following specific compounds having the Formula II are given by way of example:

4-aminophthalophenylimide
4-aminophthalo-o-methylphenylimide
4-aminophthalo-m-methylphenylimide
4-aminophthalo-p-methylphenylimide
4-aminophthalo-o-chlorophenylimide
4-aminophthalo-m-chlorophenylimide
4-aminophthalo-p-chlorophenylimide
4-aminophthalo-p-ethylphenylimide
4-aminophthalo-p-butylphenylimide
4-aminophthalo-3',5'-dimethylphenylimide
4-aminophthalo-2',4'-dimethylphenylimide
4-aminophthalo-o-methoxyphenylimide
4-aminophthalo-p-methoxyphenylimide
4-aminophthalo-$\alpha$-naphthylimide, or
4-aminophthalo-$\beta$-naphthylimide The corresponding 3-aminophthaloimide derivatives are also suitable as compounds having the Formula II.

The compounds having the Formula II may be diazotized by conventional methods, for example in the presence of dilute hydrochloric acid or sulfuric acid in water or a mixture of water with an organic solvent. During the coupling the pH range is advantageously chosen so strongly acid that the reaction only just proceeds.

The new dyes give bluish red to claret dyeings having very good light fastness from an acid liquor on wool, silk or synthetic polyamide fibers. The new dyes have adequate to very good leveling power and give dyeings having good to very good wet fastness. Dyeings having excellent fastness properties are obtained particularly on polyamides such as nylon 6 or nylon 6.6 or corresponding condensation products from dicarboxylic acids having eight, ten or twelve carbon atoms with diamines.

The invention is further illustrated in the followed examples. Unless stated otherwise, references to parts and percentages are by weight.

EXAMPLE 1

25.4 parts of 3-aminophthalic acid-p-methylphenylimide is stirred with 200 parts of water, 25 parts by volume of concentrated hydrochloric acid is added with 100 parts of ice followed by 30 parts by volume of 23% sodium nitrite solution in one batch and the diazotization mixture is stirred for two hours at 0° to 5° C. A solution of 24 parts of 2-amino-8-hydroxynaphthalene-6-sulfonic acid in 10 parts by volume of 50% caustic soda solution and 250 parts of water is allowed to flow into the clear diazo solution in the course of half an hour. When the coupling is over, the whole is neutralized by adding sodium carbonate and the dye salt is precipitated at 40° C. by adding sodium chloride. The product is dried and a dark red powder is obtained which dissolves in hot water with a red coloration and dyes polycaprolactam cloth and woolen cloth bluish red shades having very good wet fastness and outstanding light fastness.

EXAMPLE 2

30 parts by volume of 23% aqueous sodium nitrite solution is allowed to flow slowly at 3° to 8° C. while stirring into a solution of 23.8 parts of 3-aminophthalic acid-phenylimide in 300 parts by volume of glacial acetic acid and 25 parts by volume of concentrated hydrochloric acid. 100 parts of ice is added during the addition of the sodium nitrite solution. The whole is then stirred for another two hours at 0° to 5° C. and adjusted to a pH value of 4 by adding a 50% sodium acetate solution. A solution of the sodium salt of 24.3 parts of 2-amino-8-hydroxynaphthalene-6-sulfonic acid in 250 parts by volume of water is slowly added to the diazo solution. When coupling is over, 300 parts by volume of saturated common salt solution is added with stirring and the precipitated dye is suction filtered, washed with 10% common salt solution and dried. A dark red powder is obtained which dissolves in water with a red coloration and produces bluish claret dyeings having excellent fastness properties on polyamide cloth.

Using the same coupling component and the diazo components set out in the following table, dyes are obtained giving the shade indicated.

In the table: E=Example No., and Shade=Shade of dyeing on polyamide or wool.

| E | Diazo component | Shade |
|---|---|---|
| 3 | 4-aminophthalophenylimide | Bluish claret. |
| 4 | 3-aminophthalo-4'-methylphenylimide | Bluish red. |
| 5 | 3-aminophthalo-2',4'-dimethylphenylimide | Do. |
| 6 | 3-aminophthalo-α-naphthylimide | Do. |
| 7 | 4-aminophthalo-4'-methylphenylimide | Bluish claret. |
| 8 | 3-aminophthalo-2'-methoxyphenylimide | Bluish red. |
| 9 | 4-aminophthalo-2'-methoxyphenylimide | Bluish claret. |

We claim:
1. A dye having the formula:

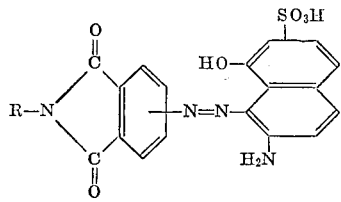

where R denotes phenyl, methylphenyl, ethylphenyl, butylphenyl, dimethylphenyl, methoxyphenyl, chlorophenyl or naphthyl.

2. A dye having the formula:

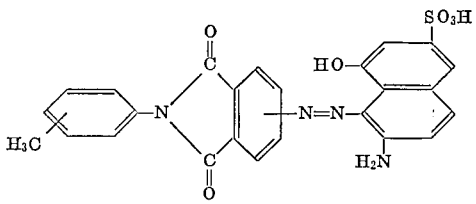

References Cited
UNITED STATES PATENTS
3,551,407  12/1970  Dehnert et al. _____ 260—152
FOREIGN PATENTS
1,358,145  3/1964  France _____ 260—152

CHARLES B. PARKER, Primary Examiner
D. M. PAPUGA, Assistant Examiner

U.S. Cl. X.R.
260—326 N; 8—54, 178